US012110101B2

(12) United States Patent
Shultz et al.

(10) Patent No.: US 12,110,101 B2
(45) Date of Patent: Oct. 8, 2024

(54) ROTOR BLADE WEIGHT SYSTEM

(71) Applicant: Textron Innovations Inc., Providence, RI (US)

(72) Inventors: David Shultz, Haslet, TX (US); Bryan Baskin, Arlington, TX (US); Jason Owens, Lewisville, TX (US); Robert Self, Fort Worth, TX (US); Paul Sherrill, Grapevine, TX (US); Nicholas Allen Torske, Flower Mound, TX (US)

(73) Assignee: Textron Innovations Inc., Providence, RI (US)

( * ) Notice: Subject to any disclaimer, the term of this patent is extended or adjusted under 35 U.S.C. 154(b) by 0 days.

(21) Appl. No.: 18/178,897

(22) Filed: Mar. 6, 2023

(65) Prior Publication Data

US 2024/0300641 A1 Sep. 12, 2024

(51) Int. Cl.
*B64C 27/00* (2006.01)
*B64C 27/473* (2006.01)

(52) U.S. Cl.
CPC .......... *B64C 27/008* (2013.01); *B64C 27/001* (2013.01); *B64C 27/473* (2013.01)

(58) Field of Classification Search
CPC ............. B64C 11/16–28; B64C 27/001; B64C 27/008; B64C 27/473
See application file for complete search history.

(56) References Cited

U.S. PATENT DOCUMENTS

| 4,150,920 | A * | 4/1979 | Belko | B64C 27/473 |
| | | | | 416/226 |
| 9,403,594 | B2 * | 8/2016 | Gill, III | B23P 15/04 |
| 9,597,778 | B2 * | 3/2017 | Verbowski | B25B 27/30 |
| 10,549,840 | B2 * | 2/2020 | Haldeman | B64C 27/008 |
| 10,723,448 | B2 * | 7/2020 | Paulson | B64C 27/008 |
| 11,254,424 | B2 * | 2/2022 | Baldwin | B64C 27/008 |
| 2018/0362153 | A1 * | 12/2018 | Paulson | F03D 13/35 |

FOREIGN PATENT DOCUMENTS

| DE | 4005895 A1 * | 8/1991 |
| DE | 4036708 A1 * | 5/1992 |

* cited by examiner

*Primary Examiner* — Christopher R Legendre
(74) *Attorney, Agent, or Firm* — Lightfoot & Alford PLLC

(57) ABSTRACT

A rotorcraft has a rotor blade having a spar comprising an internal space. A weight system is disposed within the spar and the weight system includes a weight tray having an open top, a weight guide rod connected to the weight tray. The weight guide rod extends in a spanwise direction through an interior of the weight tray and a weight is disposed on the weight guide rod and vertically captured by at least one side wall of the weight tray. The weight guide rod is insertable into the weight tray from a location above the weight tray to restrict longitudinal movement of the weight guide rod relative to the weight tray.

13 Claims, 18 Drawing Sheets

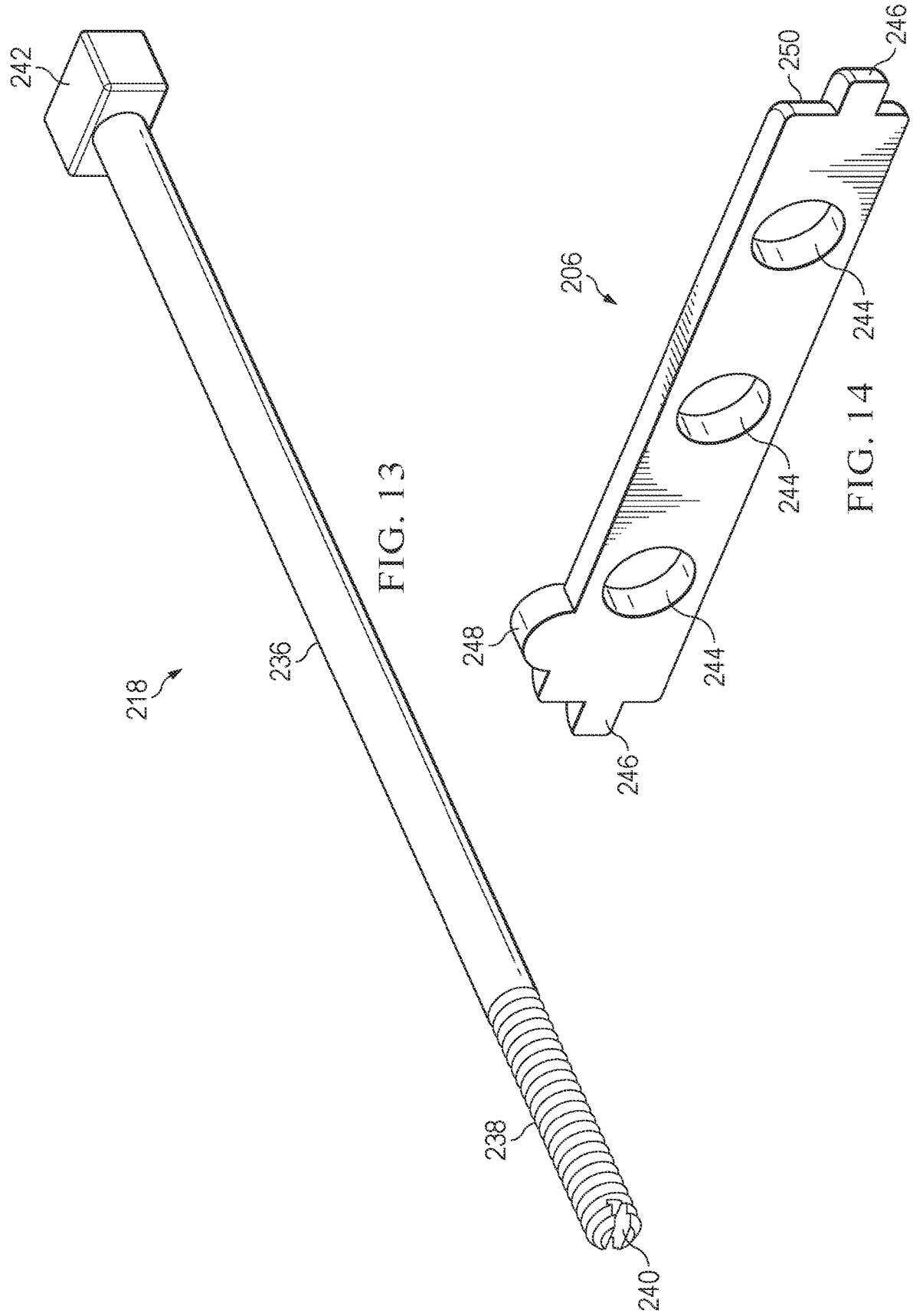

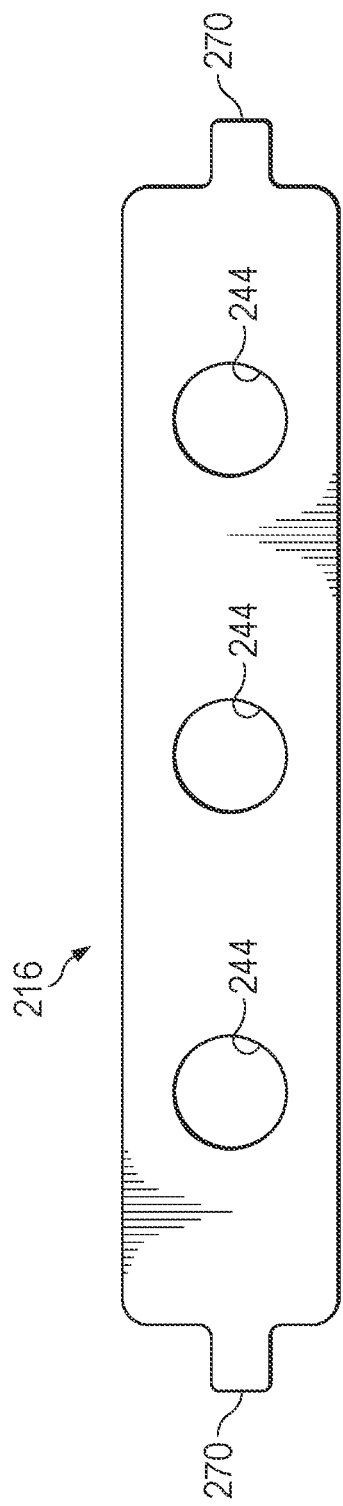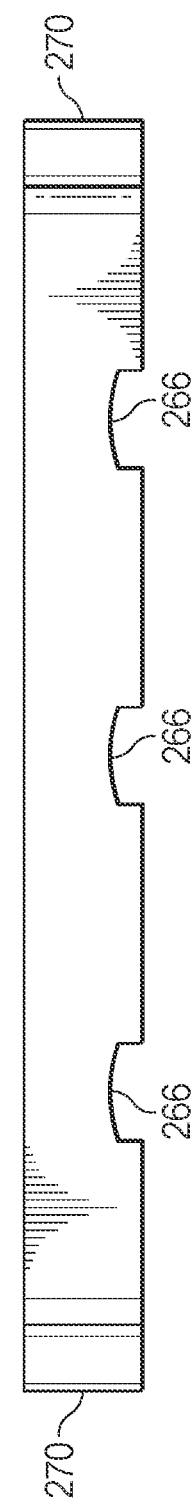

ROTOR BLADE WEIGHT SYSTEM

STATEMENT REGARDING FEDERALLY FUNDED RESEARCH OR DEVELOPMENT

This invention was made with Government support under Agreement No. AMTC 19-08-006. The Government has certain rights in the invention.

BACKGROUND

Many systems for balancing rotorcraft blades exist that utilize weights. However, existing systems for balancing rotorcraft blades require securing the systems to the blade utilizing components that extend into and/or through outer skins or other outwardly located layers of the blade. In some cases, holes are formed in the outer skins to accommodate fasteners that extend through the outer skins. In other cases, access doors to the systems for balancing the blade similarly require breaks and/or discontinuities in the outer skins and/or outer mold line of the blade. The breaks and/or discontinuities in the outer skins and/or outer mold line of the blade generally tend to promote premature erosion and/or cracking of the material due to stress concentrations and/or increases in collisions with particulate matter such as sand. Further, systems for balancing rotorcraft blades are not easily accessible after the blade is fully constructed, sometimes requiring overly destructive disassembly to access and/or adjust the systems for balancing the blade. Still further, some systems comprising weight boxes are unduly heavy or have features that are difficult to manipulate when installing weights.

BRIEF DESCRIPTION OF THE DRAWINGS

FIG. 13 is an oblique view of a T-bar of the weight system of FIG. 4.
FIG. 14 is an oblique view of buffer element of the weight system of FIG. 4.
FIG. 21 is a rear view of the spacer of FIG. 19.
FIG. 22 is a top view of the spacer of FIG. 19.

DETAILED DESCRIPTION

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
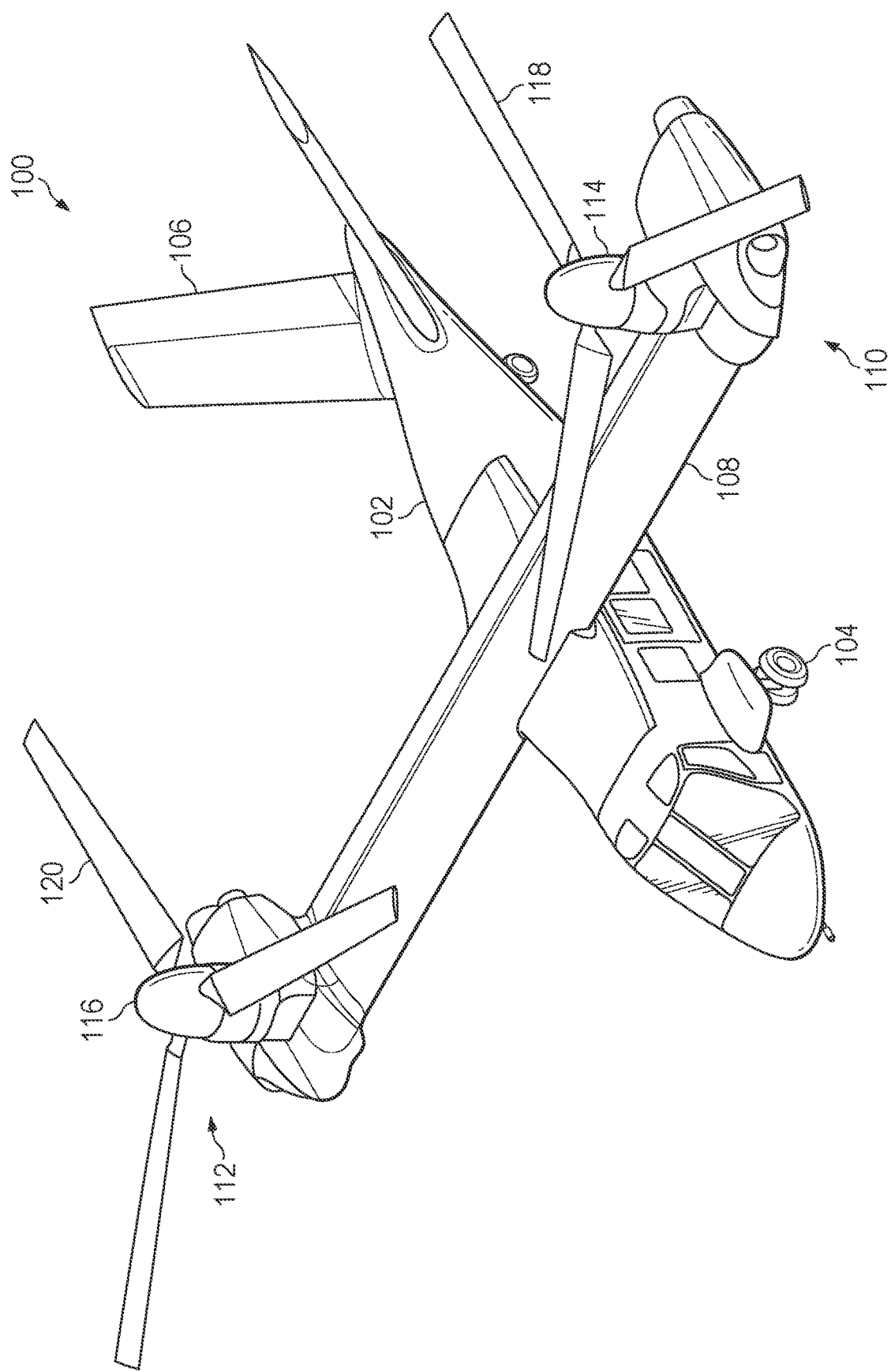
FIG. 1 is an oblique view of an aircraft according to an embodiment of this disclosure showing the aircraft in a helicopter mode of operation, the aircraft comprising a weight system according to an embodiment of this disclosure.
Figure 2:
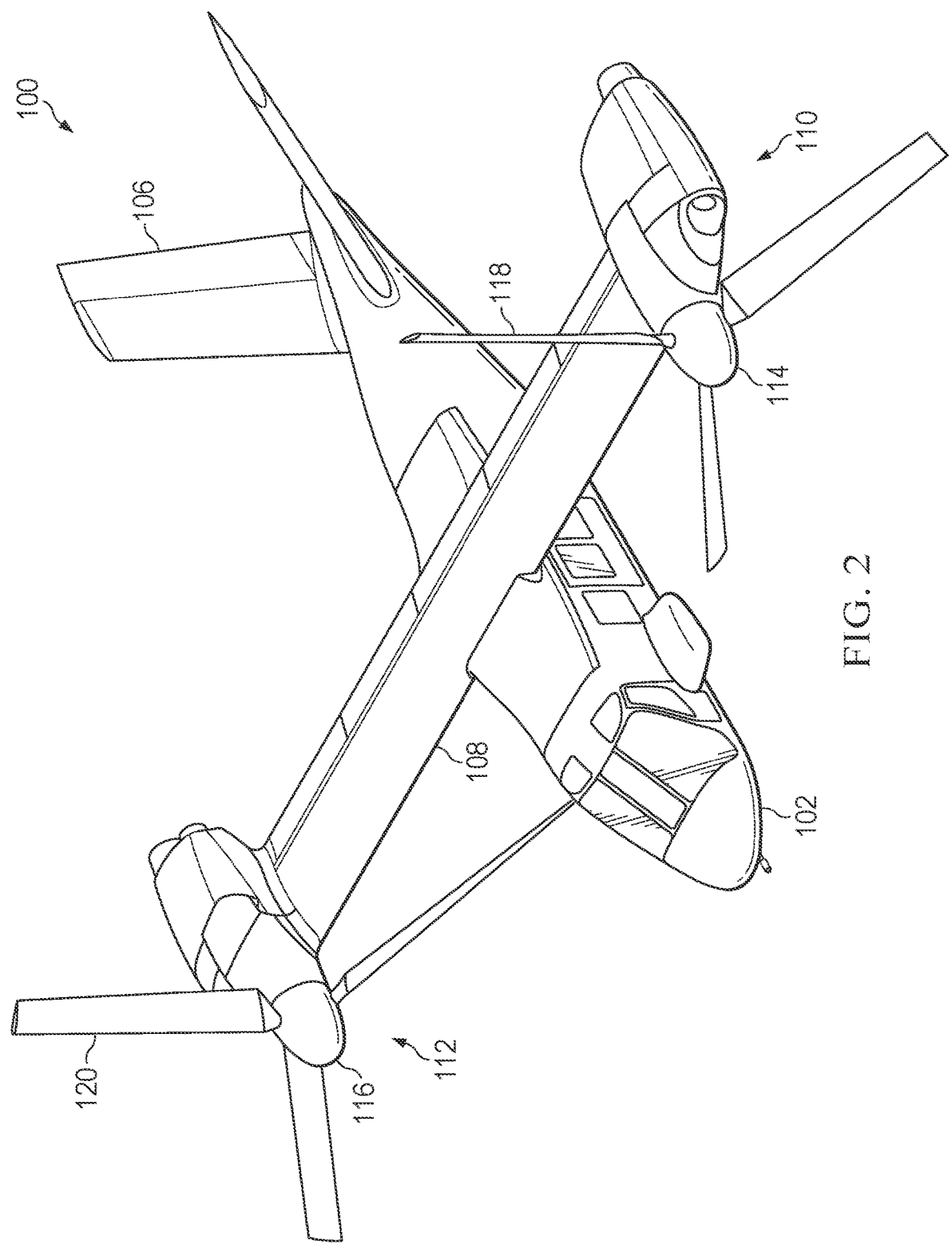
FIG. 2 is an oblique view of the aircraft of FIG. 1 showing the aircraft in an airplane mode of operation.

Referring to FIGS. 1 and 2 in the drawings, a tiltrotor aircraft 100 is illustrated. Tiltrotor aircraft 100 can include a fuselage 102, a landing gear 104, a tail member 106, a wing 108, a propulsion system 110, and a propulsion system 112. Each propulsion system 110 and 112 includes a fixed engine and a rotatable proprotor 114 and 116, respectively. Each rotatable proprotor 114 and 116 have a plurality of rotor blades 118 and 120, respectively, associated therewith. The position of proprotors 114 and 116, as well as the pitch of rotor blades 118 and 120, can be selectively controlled in order to selectively control direction, thrust, and lift of tiltrotor aircraft 100.

FIG. 1 illustrates tiltrotor aircraft 100 in a grounded helicopter mode, in which proprotors 114 and 116 are positioned substantially vertical to provide a lifting thrust. FIG. 2 illustrates tiltrotor aircraft 100 in an airplane mode, in which proprotors 114 and 116 are positioned substantially horizontal to provide a forward thrust in which a lifting force is supplied by wing 108. It should be appreciated that tiltrotor aircraft can be operated such that proprotors 114 and 116 are selectively positioned between airplane mode and helicopter mode, which can be referred to as a conversion mode.

Figure 3:
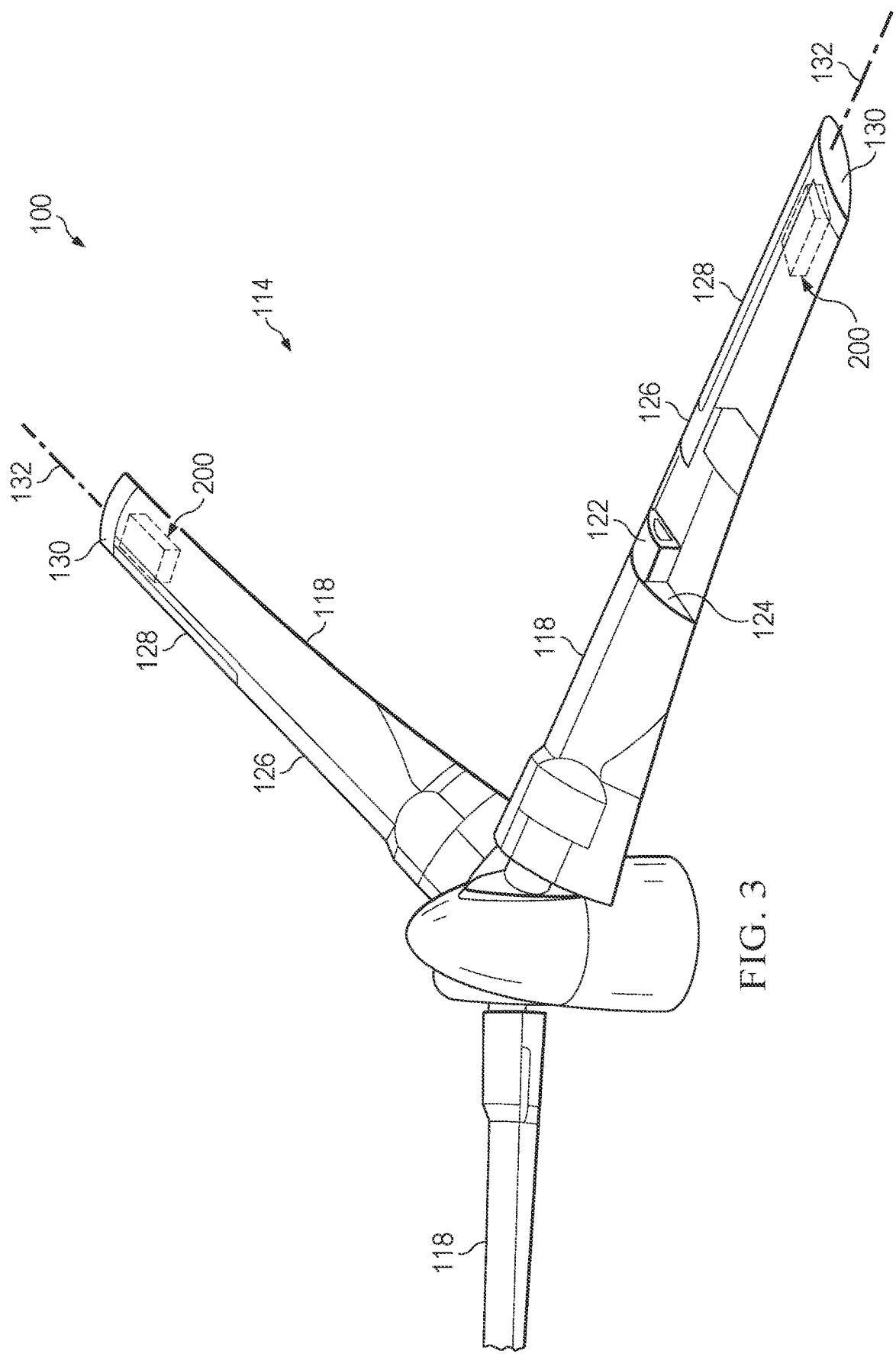
FIG. 3 is a partial oblique view of the aircraft of FIG. 1 showing a proprotor of the aircraft of FIG. 1.

FIG. 3 illustrates proprotor 114 and shows that rotor blades 118 comprise composite construction. More specifically, the rotor blades 118 generally comprise a spar 122 that serves as a primary structural component, a lightweight composite core 124, an outer skin 126, an erosion shield 128, and an end cap 130. In other embodiments, the rotor blades 118 can further comprise heater mats, foam fillings, and/or other features. The rotor blades 118 further comprise a pitch change axis 132 about which the rotor blades 118 can be rotated to change a pitch of the rotor blades 118. Still further, each of the rotor blades 118 comprise a weight system 200 disposed within an interior space of the spar 122 at a spanwise location near the end cap 130. While one of the rotor blades 118 of FIG. 3 is shown with portions cut away for illustration purposes to highlight the internal construction of the rotor blades 118, the spar 122, the composite core 124, and the outer skin 126 are generally continuous along a spanwise direction as shown in the uppermost located rotor blade 118 of FIG. 3. The proprotor 116 is substantially symmetric to the proprotor 114; therefore, for sake of efficiency certain features will be disclosed only with regard to proprotor 114. However, one of ordinary skill in the art would fully appreciate an understanding of proprotor 116 based upon the disclosure herein of proprotor 114.

Further, proprotors 114, 116 are illustrated in the context of tiltrotor aircraft 100; however, proprotors 114, 116 can be implemented on other tiltrotor aircraft. For example, an alternative embodiment may include a quad tiltrotor that has an additional wing member aft of wing 108, the additional wing member can have additional proprotor systems similar to proprotors 114, 116. In another embodiment, proprotors 114, 116 can be used with an unmanned version of tiltrotor aircraft 100. Further, proprotors 114, 116 can be integrated into a variety of tiltrotor aircraft configurations. The tiltrotor aircraft 100 further comprises weight systems 200 described in greater detail below.

Figure 4:
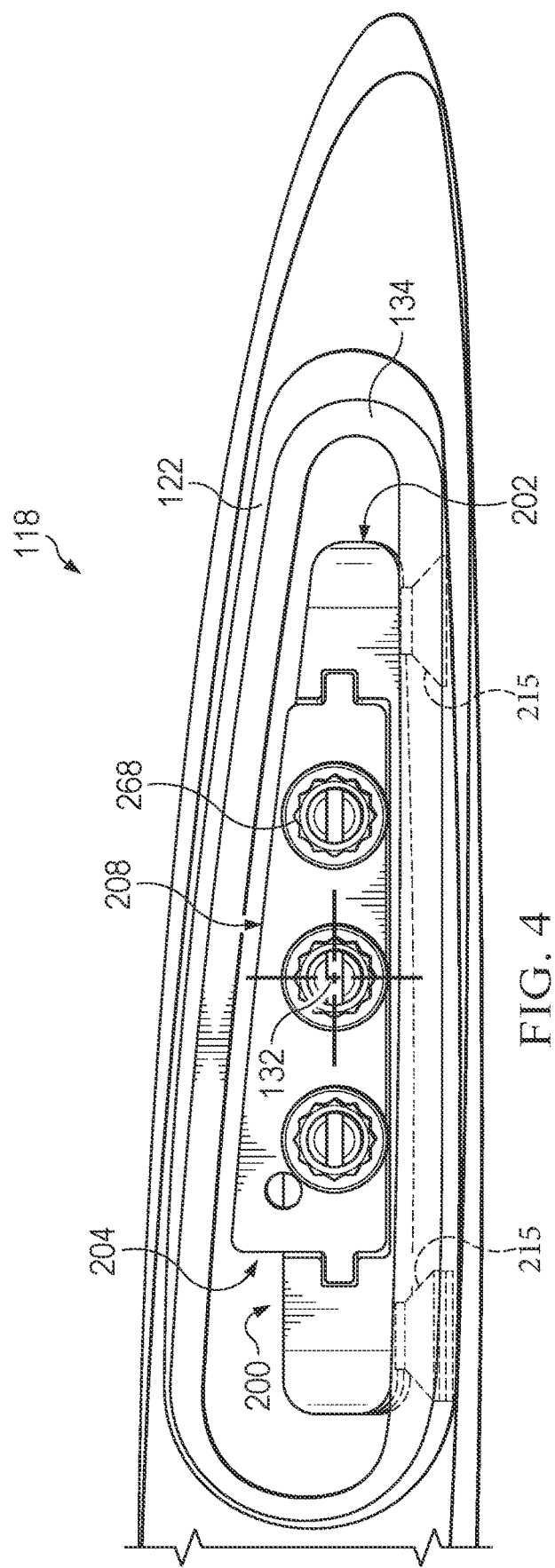
FIG. 4 is front view of a rotor blade of the aircraft of FIG. 1, the rotor blade comprising a weight system according to an embodiment of this disclosure.
Figure 5:
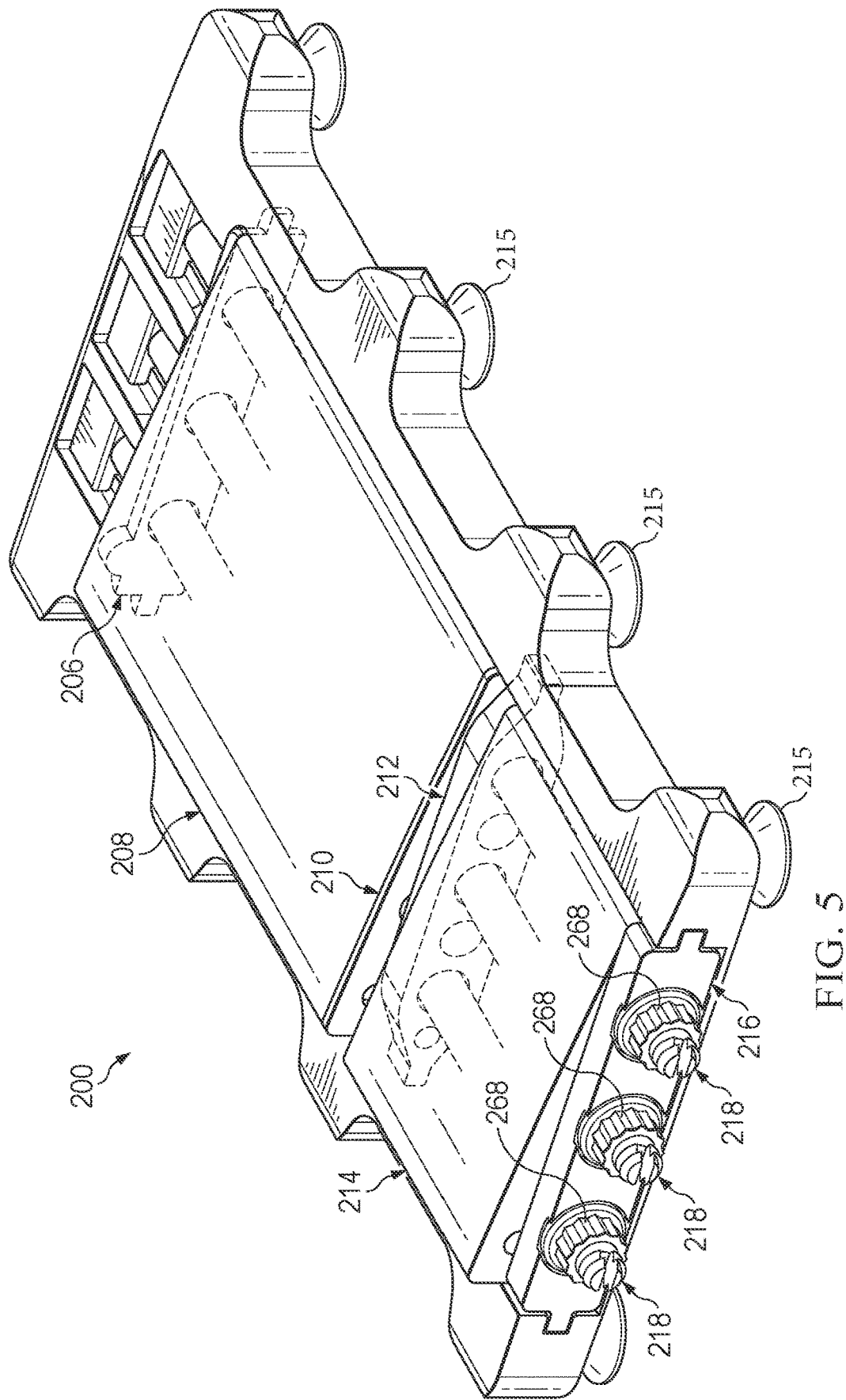
FIG. 5 is an oblique view of the weight system of FIG. 4.
Figure 6:
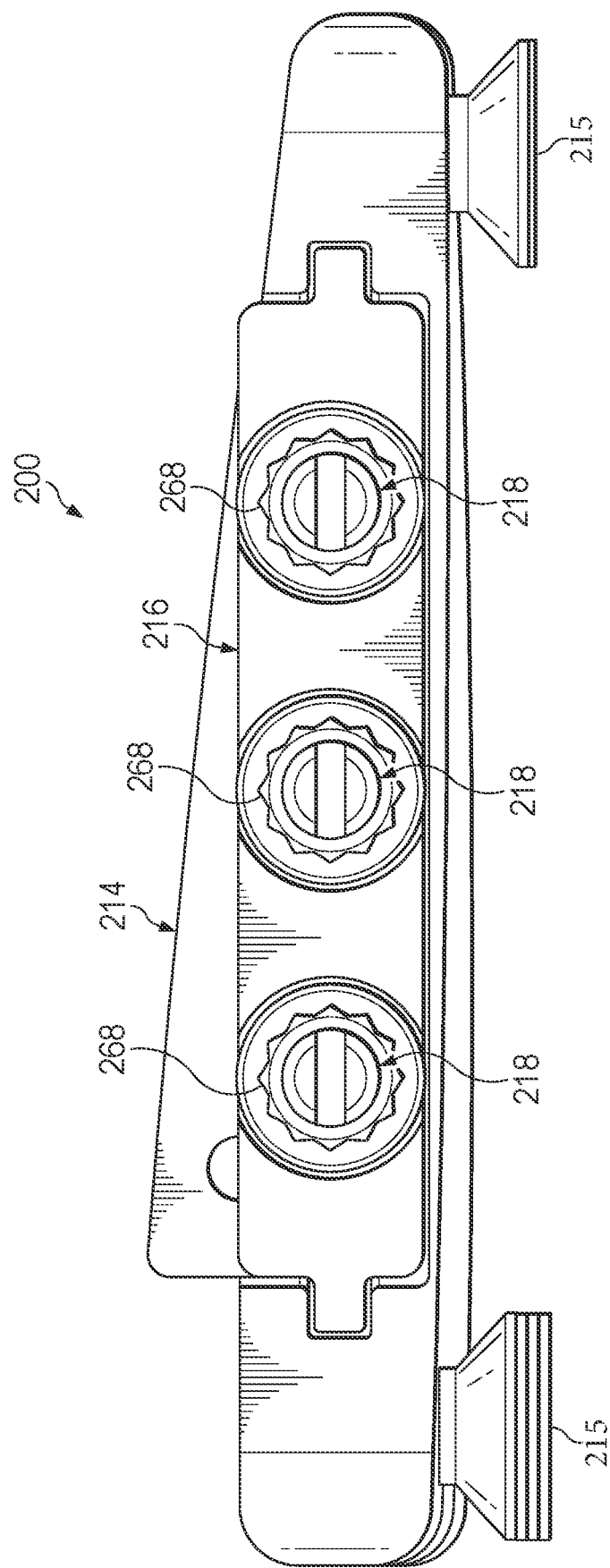
FIG. 6 is a front view of the weight system of FIG. 4.
Figure 7:
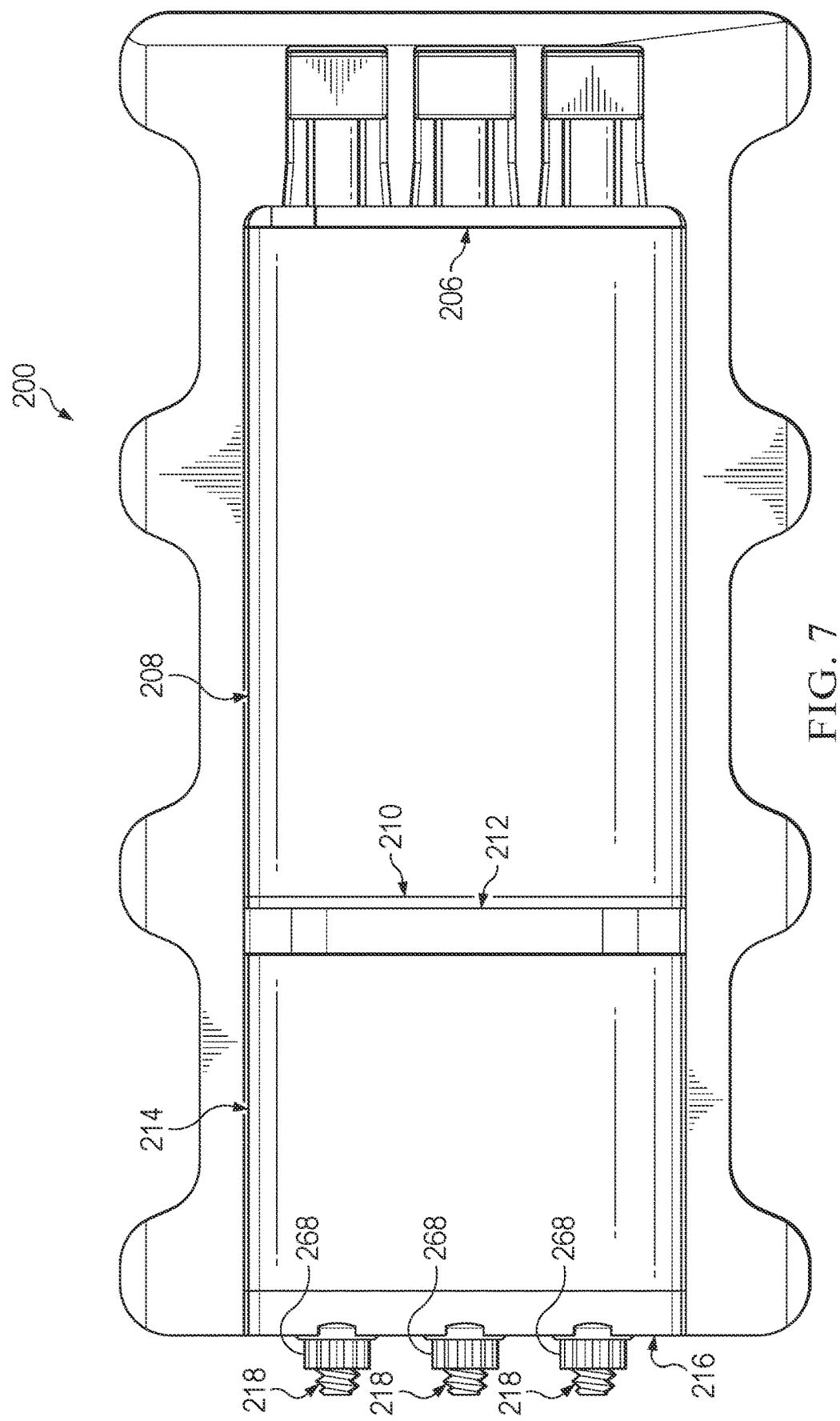
FIG. 7 is a top view of the weight system of FIG. 4.
Figure 8:
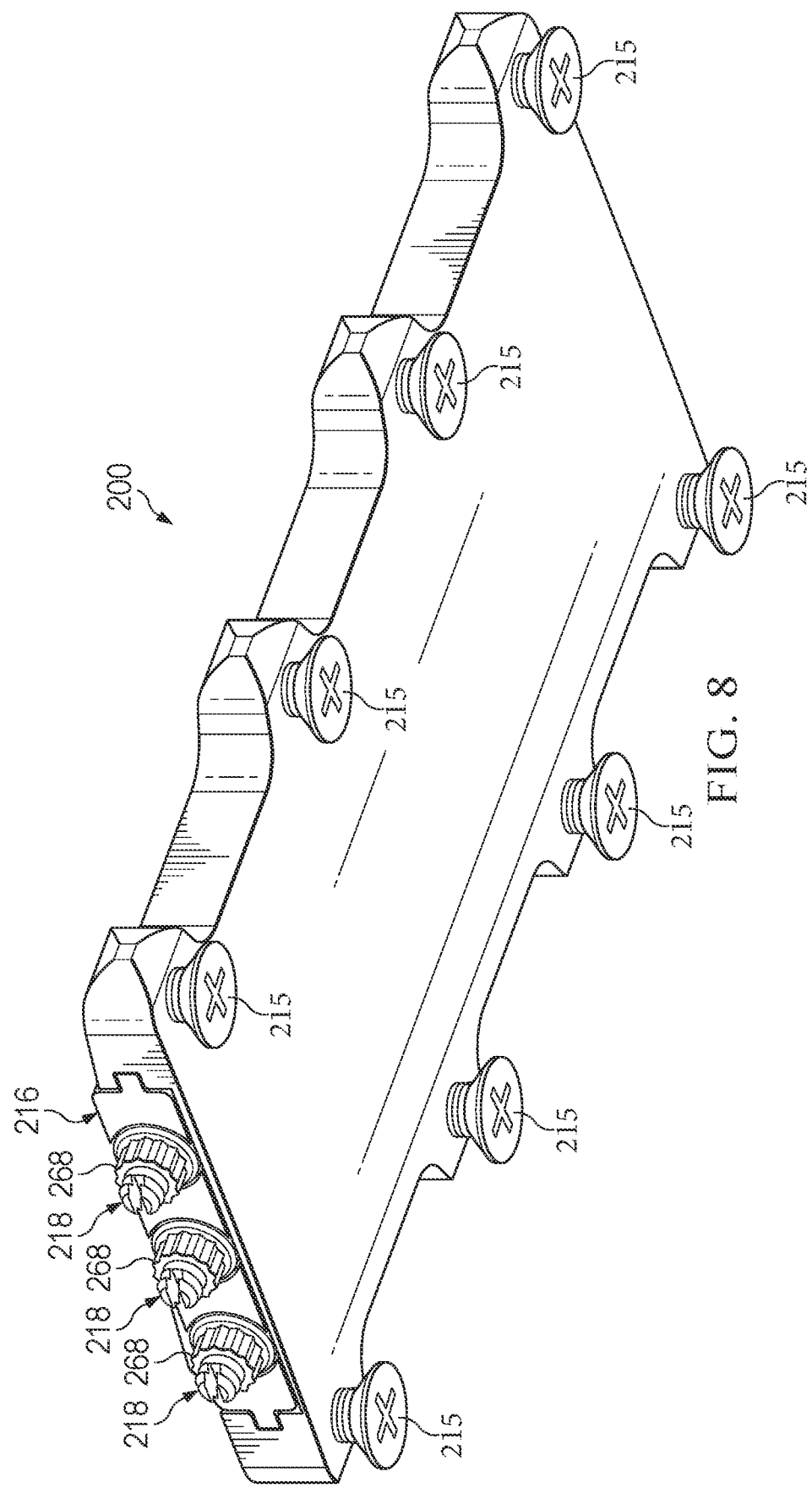
FIG. 8 is an oblique bottom view of the weight system of FIG. 4.
Figure 9:
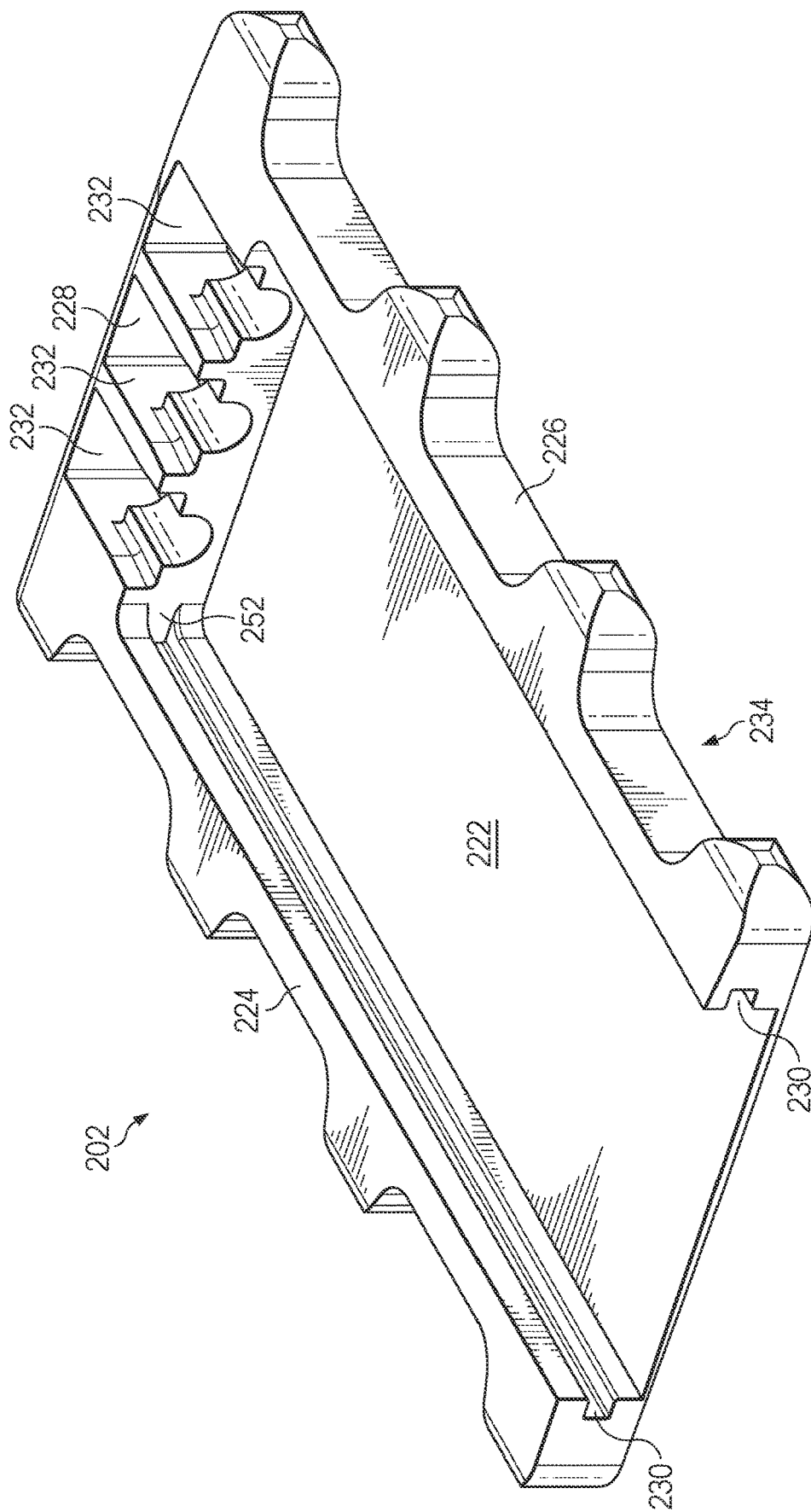
FIG. 9 is an oblique top view of a tray of the weight system of FIG. 4.
Figure 10:
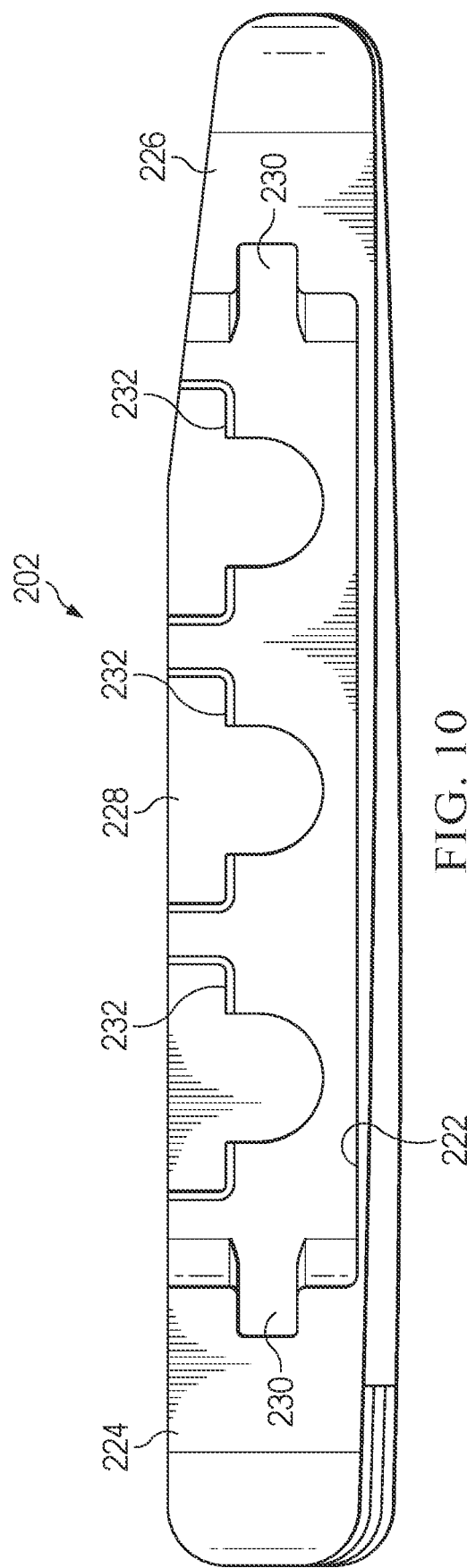
FIG. 10 is a front view of the tray of FIG. 9.
Figure 11:
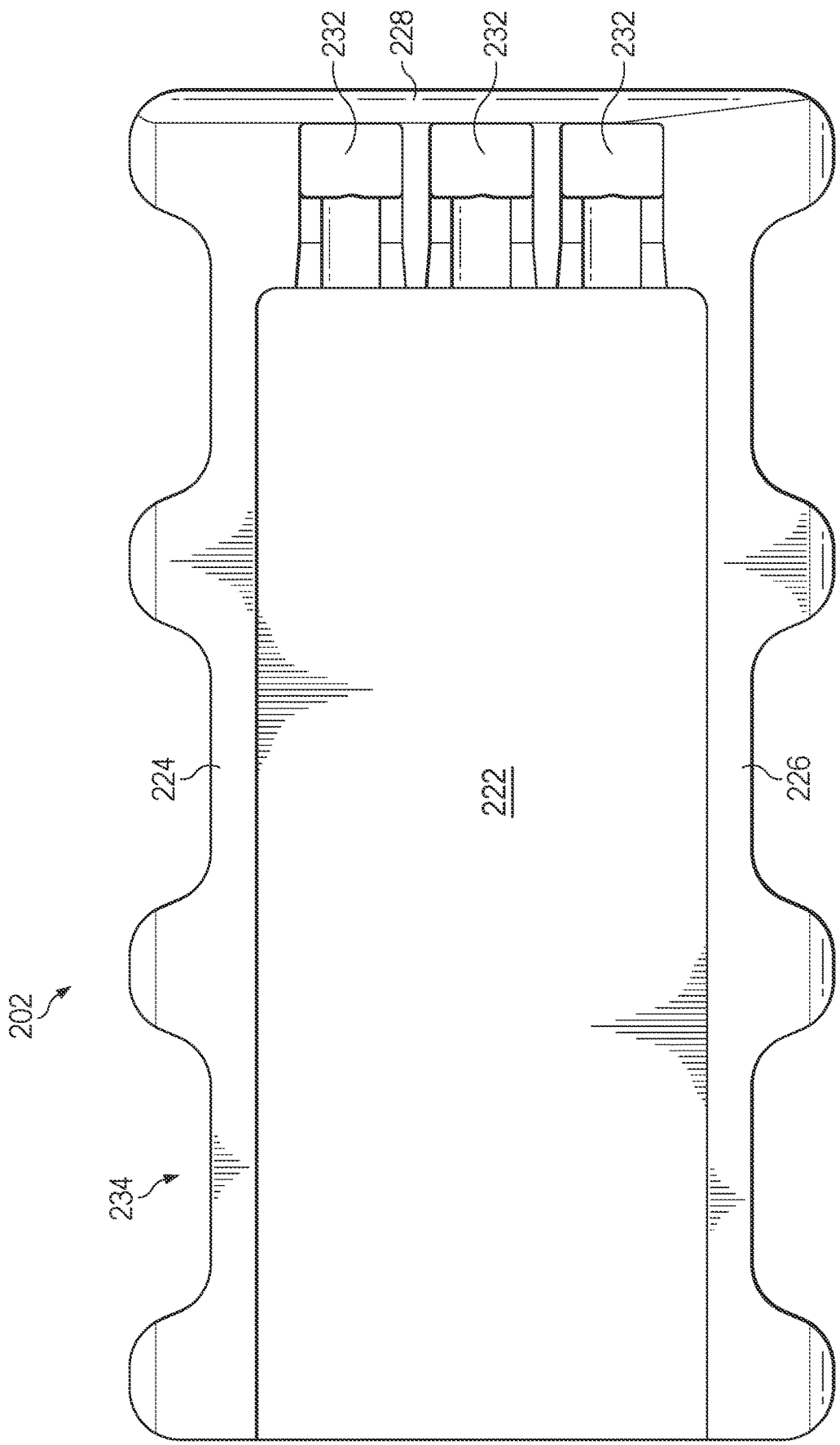
FIG. 11 is a top view of the tray of FIG. 9.
Figure 12:
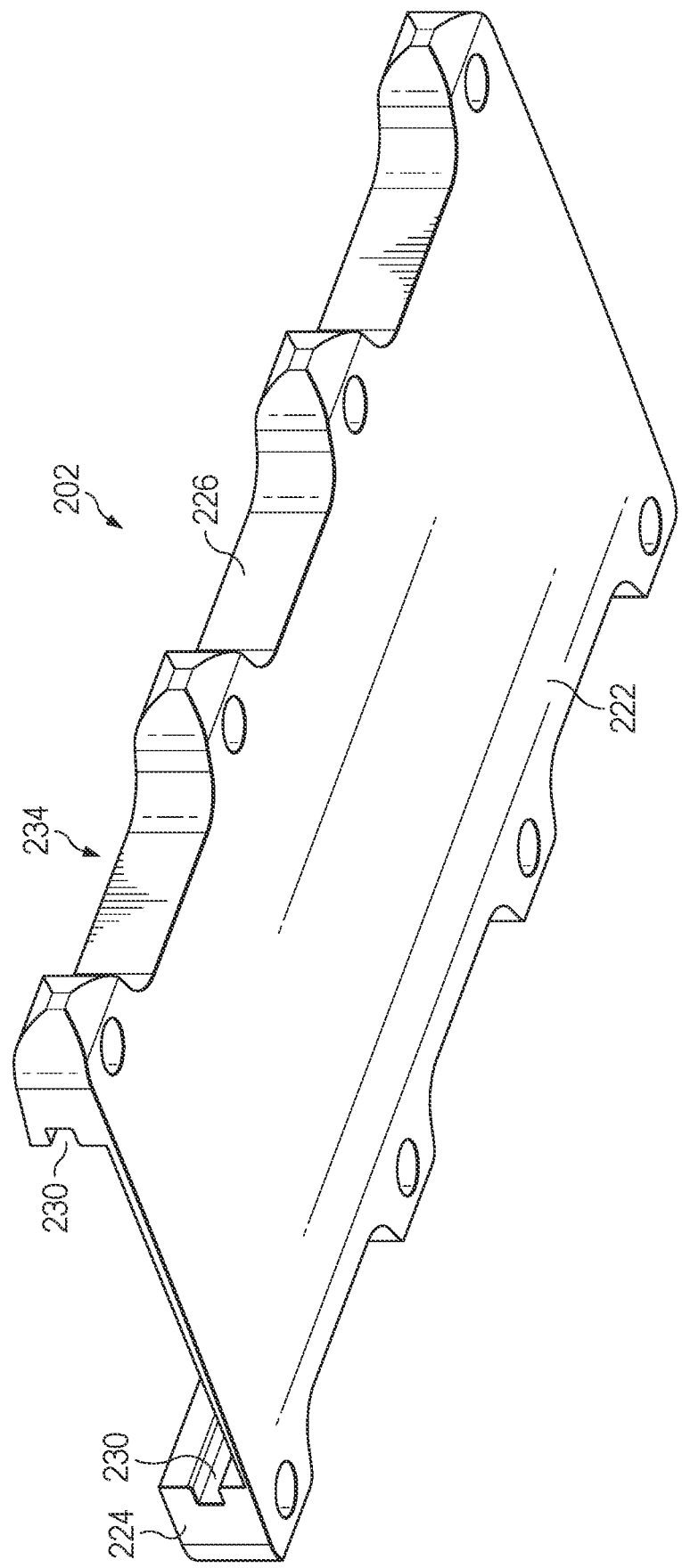
FIG. 12 is an oblique bottom view of the tray of FIG. 9.

Referring now to FIGS. 4, a weight system 200 is shown disposed within a spar 122 of a rotor blade 118 and with the end cap 130 removed. In this embodiment, the weight system 200 is located near a tip end 134 of the spar 122. In this embodiment, the weight system 200 is attached to the spar 122 by both adhesive bonding and through use of fasteners, but connecting the weight system 200 to the spar 122 also provides a smooth, undisturbed, aerodynamic blade surface that prevents premature blade surface erosion.

Referring more generally to FIGS. 5-8, the weight system 200 generally comprises a weight tray 202, that is installed through the tip end 134 of the spar 122 prior to rotor blade 118 assembly. In this embodiment the weight tray 202 is bonded and fastened to the lower inner spar surface and subsequently covered over with rotor blade 118 components to prevent the weight tray 202 from separating from the rotor blade 118. After the rotor blade 118 is cured and machined to final shape, a weight package 204 can be inserted into the weight tray 202 and fastened in place. The weight package 204 can comprises a titanium buffer element 206, static weights 208 constructed of titanium, steel, or tungsten, titanium minimum weights 210, composite weights 212 constructed of glass such as G10 Glass, high volume dynamic weights 214 constructed of titanium, steel, or tungsten, a titanium fastener spacer 216, and threaded stainless steel (such as 13-8 H1000 CRES) weight guide rods 218. The weight system 200 can be adjusted to balance the full set of rotor blades 118 to each other. Adjustment of the weight system 200 can be accomplished by accessing the weight system 200 through the tip end 134 of the spar 122 and/or rotor blade 118. The dynamic weights 214 are decoupled from the static weights 208 so that fine tuning of the rotor blade 118 does not require that the entire weight package 204 be removed. In this embodiment, a central one of the three weight guide rods 218 is configured to lie on the pitch change axis 132 and/or center of twist of the rotor blade 118. Accordingly, the weight system 200 allows location of weights forward or aft of the pitch change axis 132 to adjust the rotor blade 118 chord balance. Further, because the weight system 200 does not disturb the outermost layers and/or features of the rotor blade 118, a higher reliability of bondline inspection can be achieved before the rotor blade 118 is fully assembled.

In assembly, heads of fasteners 215 are configured to be flush with the spar 122 outer surface. After the weight box 202 is attached to the inside of the spar 122, the rotor blade 118 components are assembled to the spar 122 so that no outer spar surface remains exposed. Next, the fasteners 215 are covered by blade components such as an outer skin so that the weight system 200 is trapped within the rotor blade 118. Further, the weight system 200 does not interfere with any electrical heating elements that may be utilized in the rotor blade 118 for icing protection.

Referring now to FIGS. 9-12, weight tray 202 comprises a floor 222, a first side wall 224, a second side wall 226, and a rear wall 228. The weight tray 202 comprises an open top. Each of the side walls 224, 226 comprise vertical retention profiles 230, in this embodiment, rectangular channels formed front-back for retaining components vertically within the weight tray 202. In alternative embodiments, the vertical retention profiles can be different between the first side wall 224 and the second side wall 226 and/or may be shaped differently from a rectangular channel. Regardless of the shape of the vertical retention profiles, it is contemplated that each vertical retention profile be capable of vertically restraining objects therein from moving out of the weight tray 202 through the open top. The rear wall 228 comprises three weight guide rod receptacles 232 configured to allow insertion of the weight guide rods 218 from above and thereafter preventing longitudinal escape of the weight guide rods 218 from the receptacles 232. In this embodiment, the weight guide rod receptacles 232 are complimentarily shaped to match an end portion of the weight guide rods 218. In this embodiment, first and second side walls 224, 226 comprise cutouts 234 to reduce overall weight of the weight tray 202.

Referring now to FIG. 13, a weight guide rod 218 is shown. Weight guide rod 218 comprises a shank 236 having threaded portion 238, a front slot 240 for accepting a tool, and a box end 242. It will be appreciated that the box end 242 is complementary to the rearmost portion of the weight guide rod receptacles 232.

Referring now to FIG. 14, buffer element 206 comprises three rod holes 244, vertical retention profiles 246 complementary to the vertical retention profiles 230 of the weight tray 202, and a retrieval tab 248. A rear profile 250 of the buffer element 206 is configured to complement the buffer element profile 250 of the rear wall 228 so that the buffer element 206 is positionally located and seated relative to the rear wall 228. The upward protruding retrieval tab 248 also serves as a visual indicator to indicate part placement when the retrieval tab 248 is visible by viewing it from an outboard end of the blade through the retrieval tool holes 256 of the weights.

Figure 15:
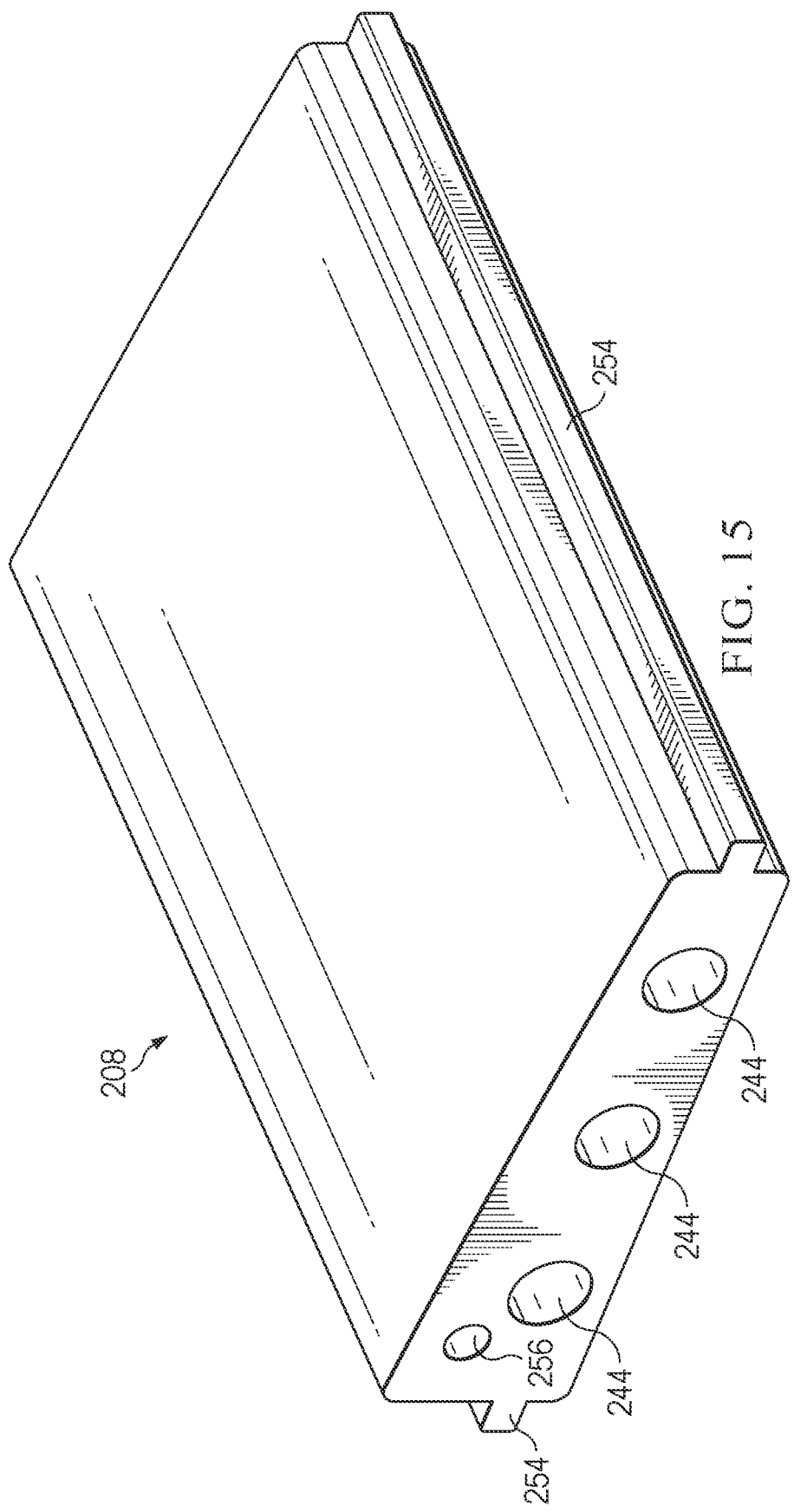
FIG. 15 is an oblique view of a static weight of the weight system of FIG. 4.

Referring now to FIG. 15, a static weight 208 is shown. In alternative embodiments, multiple static weights of shorter longitudinal length can be stacked together to obtain a desired total static weight mass instead of using a single static weight. Static weight 208 comprises three rod holes 244, vertical retention profiles 254 complementary to the vertical retention profiles 230 of the weight tray 202, and a retrieval tool hole 256.

Figure 16:
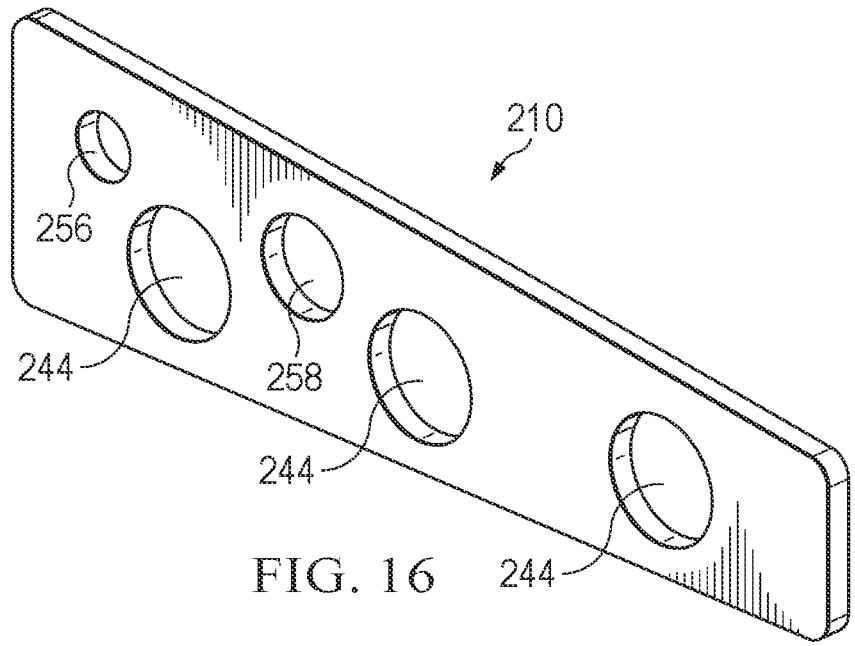
FIG. 16 is an oblique view of a minimum weight of the weight system of FIG. 4.

Referring now to FIG. 16, a minimum weight 210 is shown. Minimum weight 210 comprises three rod holes 244, a retrieval tool hole 256, and an additional aperture 258 that can be sized as desired to further reduce mass of the minimum weight 210. Unlike static weight 208, minimum weight 210 comprises no vertical retention profiles. However, in alternative embodiments, a minimum weight can comprise vertical retention profiles.

Figure 17:
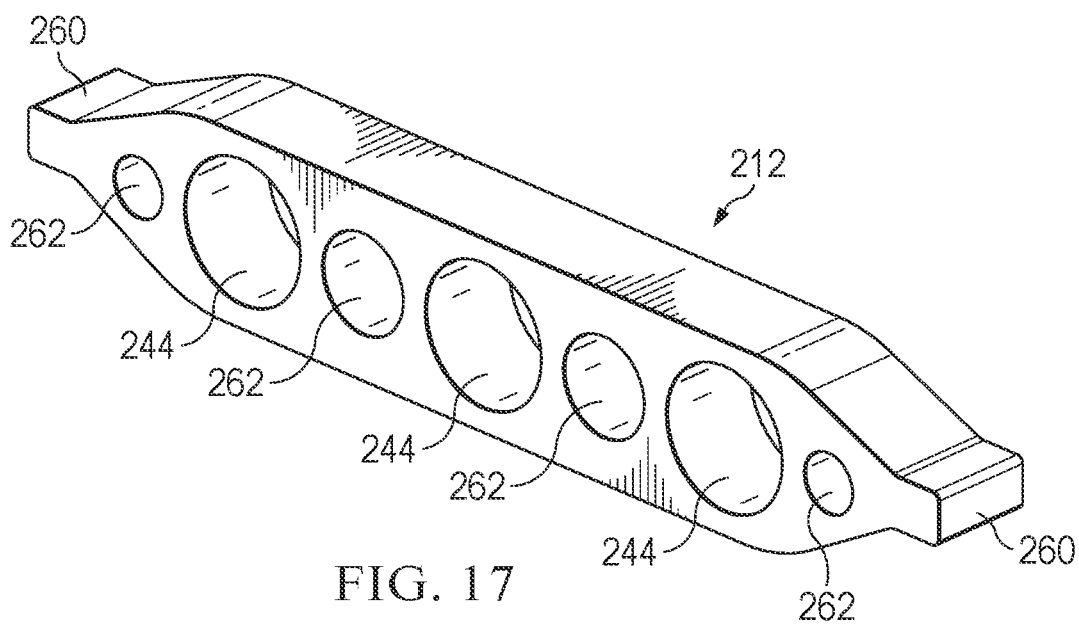
FIG. 17 is an oblique view of a composite weight of the weight system of FIG. 4.

Referring now to FIG. 17, a composite weight 212 is shown. Composite weight 212 can comprise a composite material and is shaped differently than static weight 208. More specifically, composite weight 212 is constructed to have a shape that is laterally symmetrical. Composite weight further comprises three rod holes 244, vertical retention profiles 260 complementary to vertical profiles 230 of weight tray 202, and other weight saving apertures 262.

Figure 18:
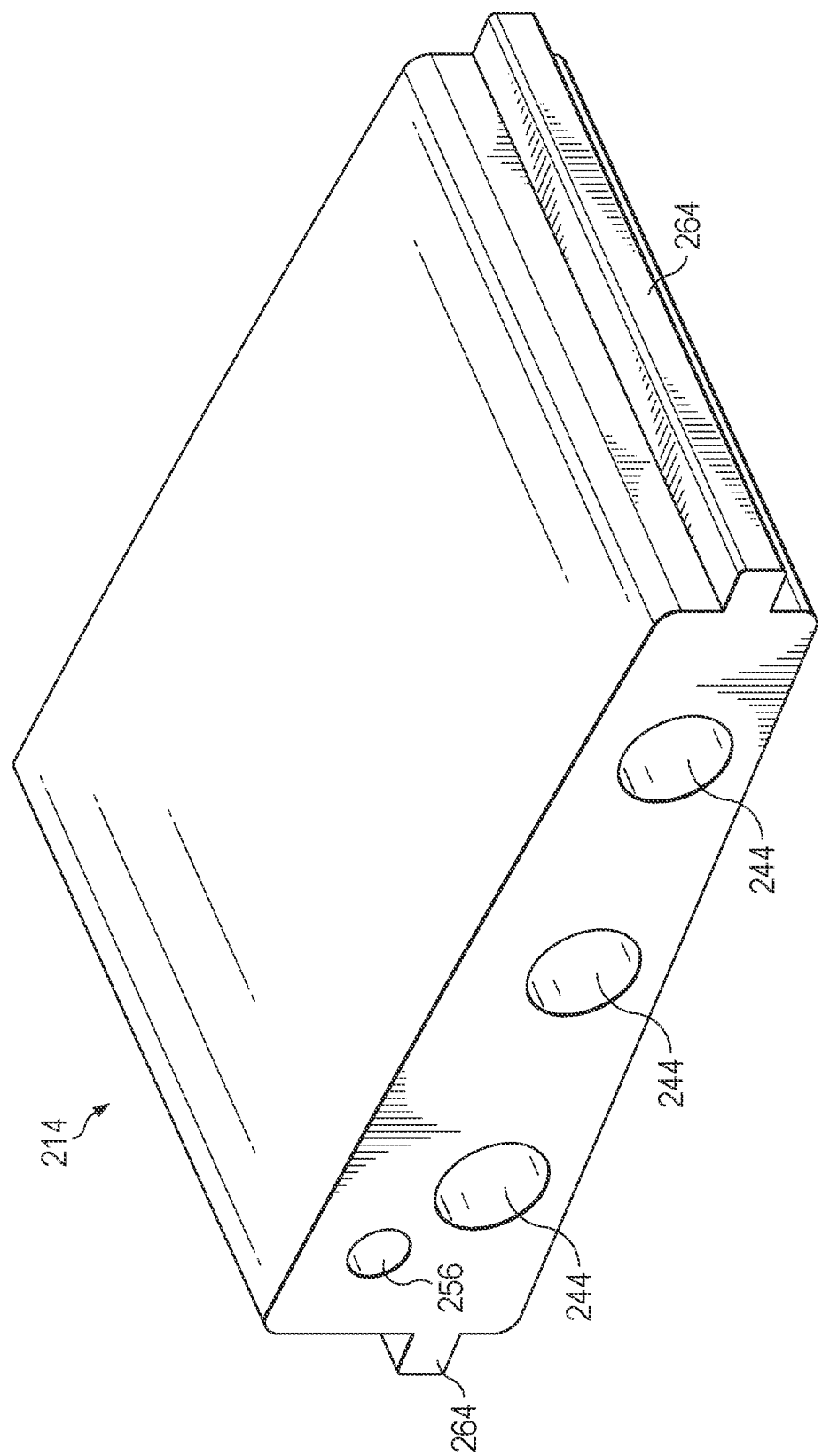
FIG. 18 is an oblique view of a dynamic weight of the weight system of FIG. 4.
Figure 19:
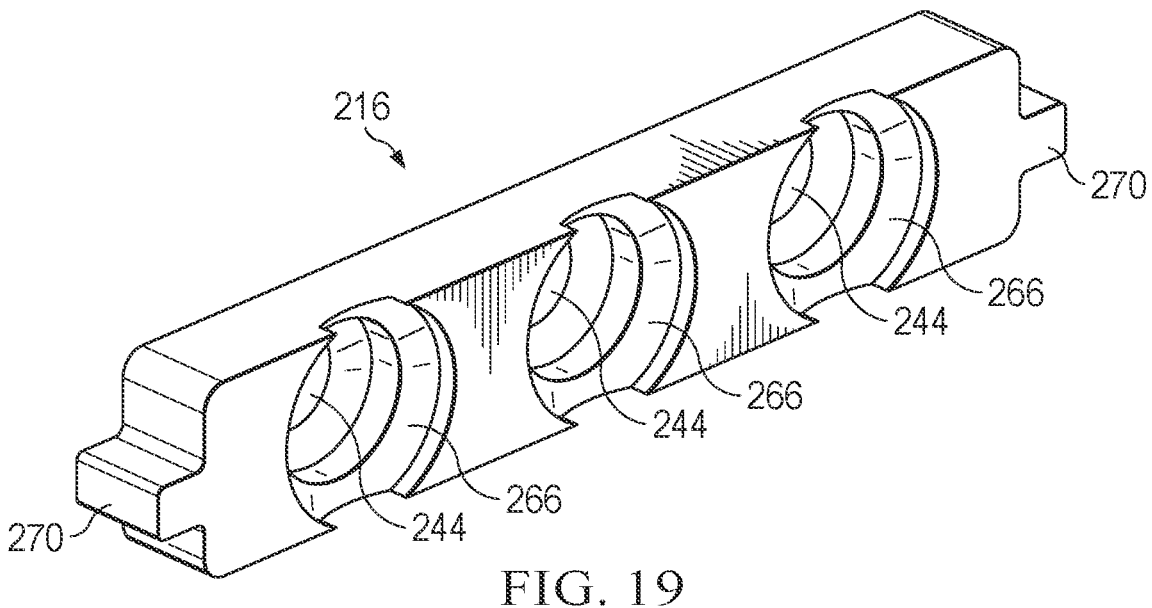
FIG. 19 is an oblique front view of a spacer of the weight system of FIG. 4.
Figure 20:
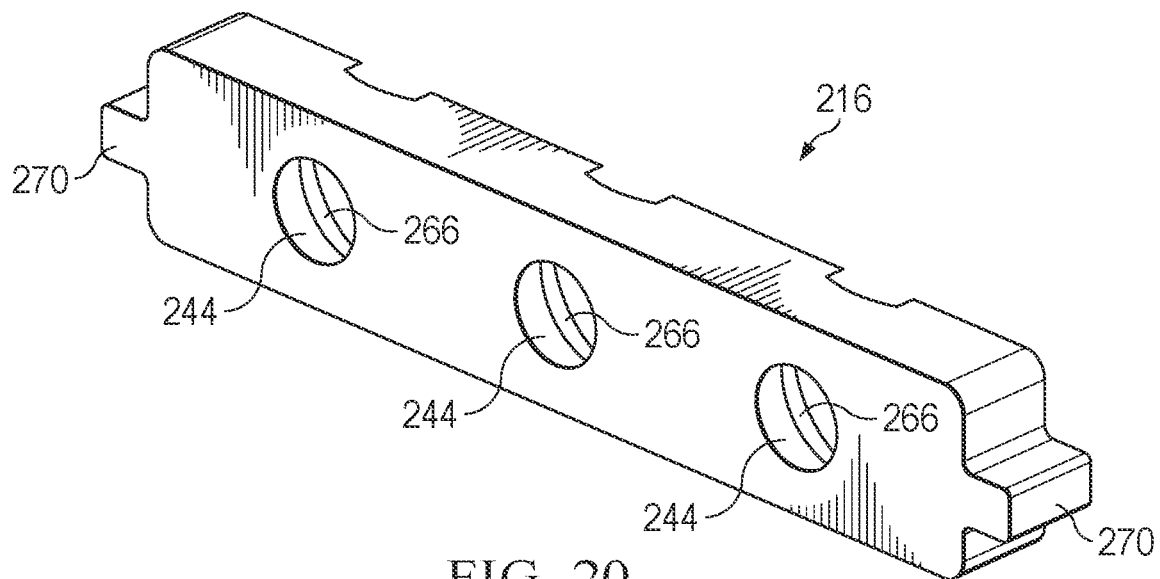
FIG. 20 is an oblique rear view of the spacer of FIG. 19.

Referring now to FIG. 18, a high volume dynamic weight 214 is shown. In alternative embodiments, multiple dynamic weights of shorter longitudinal length can be stacked together to obtain a desired total dynamic weight mass instead of using a single dynamic weight. Dynamic weight 214 comprises three rod holes 244, vertical retention profiles 264 complementary to the vertical retention profiles 230 of the weight tray 202, and a retrieval tool hole 256.

Referring now to FIGS. 19-22, a fastener spacer 216 is shown. Fastener spacer 216 is substantially laterally symmetrical and comprises three rod holes 244. Fastener spacer 216 further comprises three nut receiver depressions 266 for receiving nuts 268 rotatably therein. Fastener spacer 216 further comprises vertical retention profiles 270 that are complementary to the vertical retention profiles 230 of the weight tray 202.

The weight package 204 can be assembled using the three weight guide rods 218 and dropping the box end 242 of weight guide rods 218 into the weight guide rod receptacles 232 of the rear wall 228 to prevent rotation of the weight guide rods 218 relative to the weight tray 202. The weight guide rods can alternatively be fully threaded (such as all thread rods). Next, the buffer element 206 can be guided onto the weight guide rods 218 and abutted against the rear wall 228. Next, a desired number of static weights 208 can be guided onto the weight guide rods 218 and be caused to stack flush against the buffer element 206. Further, any combination of composite weights 212, high volume dynamic weights 214, and minimum weights 210, and in any desired order longitudinally can be guided onto the weight guide rods 218. Next, fastener spacer 216 can be guided onto the weight guide rods 218. Finally, nuts 268 can be seated into the fastener spacer 216 and advanced onto the weight guide rods 218 until the entire weight package 204 is secured.

It will be appreciated that during the guiding of the various components on to the weight guide rods, it will also be necessary to guide the vertical retention profiles of the components into the vertical retention profiles of the weight tray 202. Accordingly, the components having vertical retention profiles can be captured vertically by both the vertical retention profiles of the weight tray 202 and the weight guide rods, obviating any need for a closed top to the weight tray 202.

While the weight system 200 is primarily described above as being used with a tiltrotor aircraft 100, in alternative embodiments, the weight system 200 can be utilized in conjunction with rotor blades of any other device. Specifically, the weight systems 200 can be incorporated into rotor blades of any aircraft, including, but not limited to, airplanes, helicopters, and/or dirigibles. Still further, the weight system 200 can be utilized in conjunction with rotor blades of water craft, hovercraft, wind turbine systems, and/or any other system that utilizes rotor blades that may benefit by comprising a weight balanced rotor blade.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention.

What is claimed is:

1. A weight system, comprising:
   a weight tray having an open top; and
   a weight guide rod connected to the weight tray to restrict longitudinal movement of the weight guide rod relative to the weight tray, the weight guide rod extending in a spanwise direction into an interior of the weight tray; and
   wherein the weight guide rod is insertable into the open top from a location above the open top; and
   wherein the weight guide rod is received by the weight tray in a manner that restricts rotation of the weight guide rod about a longitudinal axis of the weight guide rod.

2. The weight system of claim 1, wherein the weight tray comprises a vertical retention profile complementary to a vertical retention profile of a weight disposed on the weight guide rod.

3. The weight system of claim 2, wherein the vertical retention profile of the weight tray comprises a rectangular channel.

4. The weight system of claim 3, wherein the vertical retention profile of the weight comprises a rectangular tab.

5. The weight system of claim 4, wherein the weight guide rod comprises a box end.

6. The weight system of claim 5, wherein the weight tray comprises a rear wall comprising a weight guide rod receptacle complementary to the box end.

7. A rotor blade, comprising:
   a weight system, the weight system comprising:
      a weight tray having an open top; and
      a weight guide rod connected to the weight tray to restrict longitudinal movement of the weight guide rod relative to the weight tray, the weight guide rod extending in a spanwise direction into an interior of the weight tray;
      wherein the weight guide rod is insertable into the open top from a location above the open top; and wherein the weight guide rod is received by the weight tray in a manner that restricts rotation of the weight guide rod about a longitudinal axis of the weight guide rod.

8. The rotor blade of claim 7, wherein the weight tray comprises a vertical retention profile complementary to a vertical retention profile of a weight disposed on the weight guide rod.

9. The rotor blade of claim 8, wherein the vertical retention profile of the weight tray comprises a rectangular channel.

10. The rotor blade of claim 9, wherein the vertical retention profile of the weight comprises a rectangular tab.

11. The rotor blade of claim 10, wherein the weight guide rod comprises a box end.

12. The rotor blade of claim 11, wherein the weight tray comprises a rear wall comprising a weight guide rod receptacle complementary to the box end.

13. A rotorcraft, comprising:
a weight system disposed within a spar, the weight system comprising:
   a weight tray having an open top; and
   a weight guide rod connected to the weight tray to restrict longitudinal movement of the weight guide rod relative to the weight tray, the weight guide rod extending in a spanwise direction into an interior of the weight tray;
   wherein the weight guide rod is insertable into the open top from a location above the open top; and
   wherein the weight guide rod is received by the weight tray in a manner that restricts rotation of the weight guide rod about a longitudinal axis of the weight guide rod.

\* \* \* \* \*